Nov. 2, 1965 P. FRANKENBERG 3,215,062
PANCAKE-MAKING MACHINE
Filed Feb. 21, 1963 7 Sheets-Sheet 1
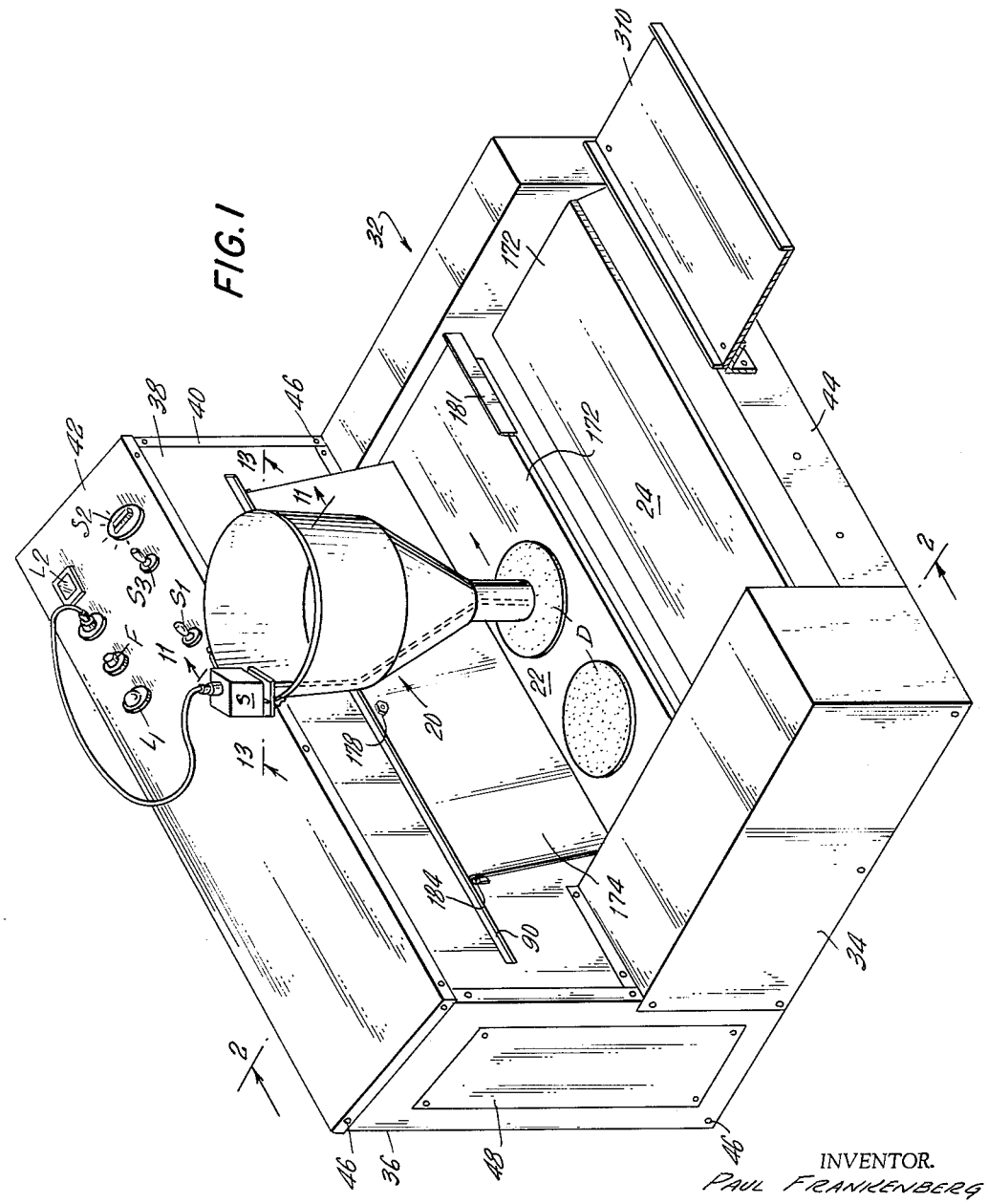
INVENTOR.
PAUL FRANKENBERG
BY Amster + Levy
ATTORNEYS Nov. 2, 1965  P. FRANKENBERG  3,215,062
PANCAKE-MAKING MACHINE
Filed Feb. 21, 1963  7 Sheets-Sheet 2

INVENTOR.
PAUL FRANKENBERG
BY *Ameter & Levy*
ATTORNEYS

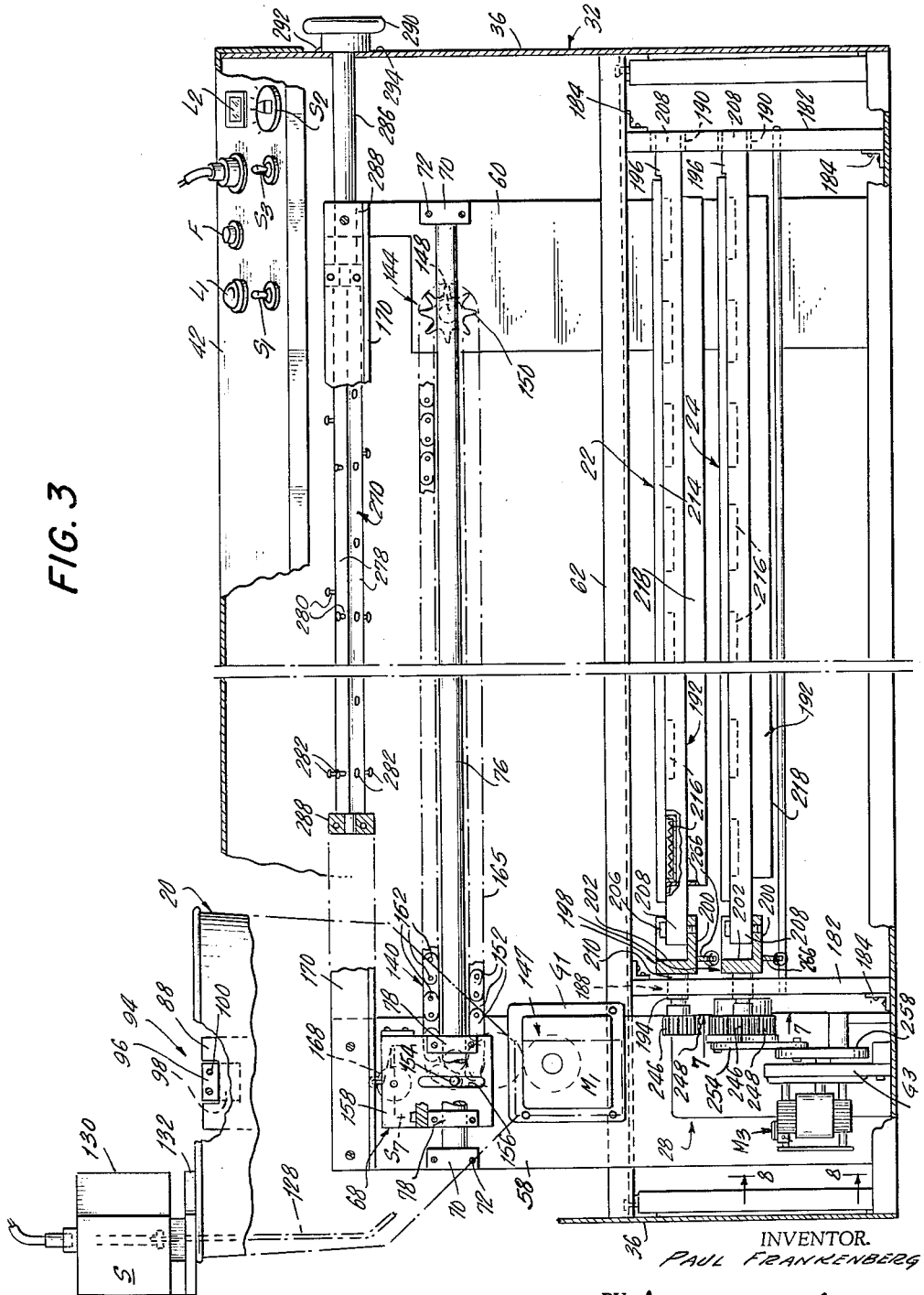

Nov. 2, 1965         P. FRANKENBERG         3,215,062
PANCAKE-MAKING MACHINE
Filed Feb. 21, 1963                         7 Sheets-Sheet 4
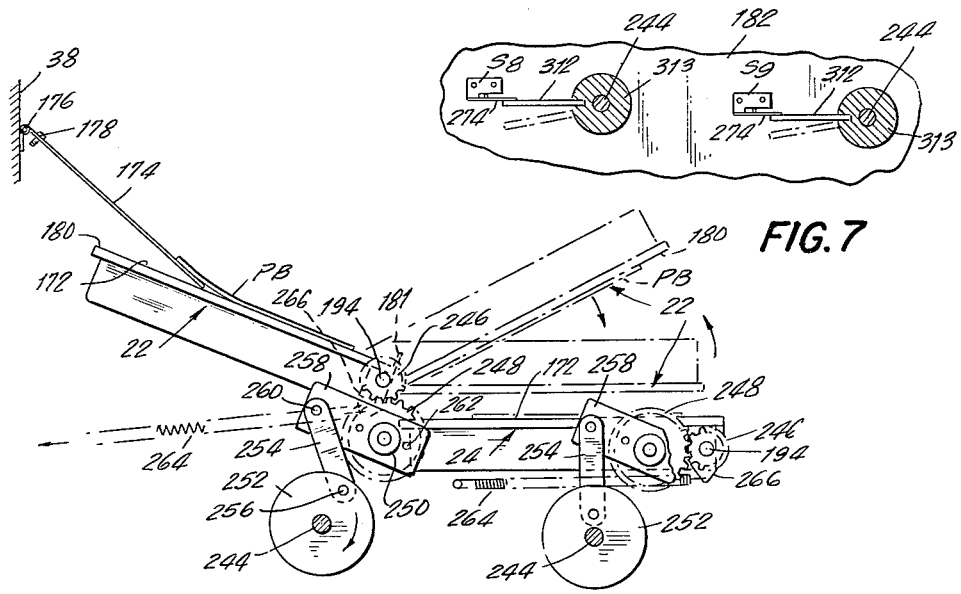
FIG. 7
FIG. 5
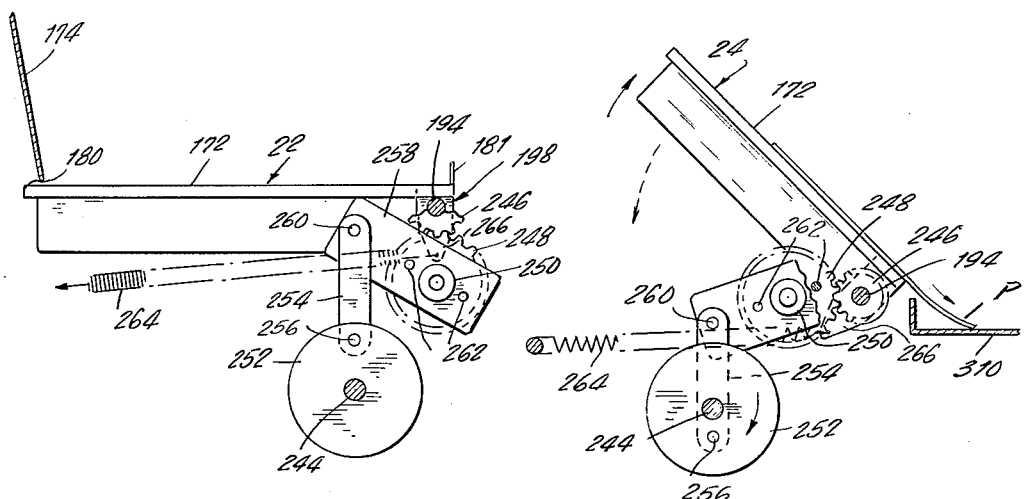
FIG. 6
INVENTOR.
PAUL FRANKENBERG
BY Amster + Levy
ATTORNEYS Nov. 2, 1965  P. FRANKENBERG  3,215,062
PANCAKE-MAKING MACHINE Filed Feb. 21, 1963  7 Sheets-Sheet 5

INVENTOR.
PAUL FRANKENBERG
BY Amster & Levy
ATTORNEYS

Nov. 2, 1965 P. FRANKENBERG 3,215,062
PANCAKE-MAKING MACHINE
Filed Feb. 21, 1963 7 Sheets-Sheet 6

INVENTOR.
PAUL FRANKENBERG
BY Amster + Levy
ATTORNEYS

Nov. 2, 1965   P. FRANKENBERG   3,215,062
PANCAKE-MAKING MACHINE
Filed Feb. 21, 1963   7 Sheets-Sheet 7

INVENTOR.
PAUL FRANKENBERG
BY Amster + Levy
ATTORNEYS

United States Patent Office 3,215,062
Patented Nov. 2, 1965

3,215,062
PANCAKE-MAKING MACHINE
Paul Frankenberg, Brooklyn, N.Y., assignor to Devero
Company of America, Brooklyn, N.Y., a partnership
Filed Feb. 21, 1963, Ser. No. 260,229
4 Claims. (Cl. 99—353)

The present invention relates generally to apparatus for preparing thin batter cakes from a liquid batter mixture by directly subjecting the faces thereof to the action of heat, and in particular to an automatic machine for making successive batches or stacks of pancakes.

Of recent times, a great deal of effort has gone into the provision of various apparatus and methods of reducing the time and labor necessary to prepare pancakes and like thin batter cakes. The practice has developed of providing a hopper for maintaining a supply of batter which is manually maintained by an operator above a cooking surface. The hopper usually includes a manually operable valve for dispensing the batter onto the cooking surface. After manipulating the valve to dispense the batter, it is necessary for the operator to remain in the vicinity of the cooking surface in order to closely observe the cooking of the batter so as to prevent burning of the pancake. Depending of the skill of the operator, it may be necessary for him to turn over the partially cooked pancake by means of a spatula type utensil in order to ascertain whether the surface of the batter in contact with the cooking surface has been completely cooked. When this batter surface has been completely cooked, it is necessary for the operator to use the spatula for inverting the partially cooked batter so as to place the uncooked surface thereof in contact with the heating surface. The latter operation requires a degree of skill on the part of the operator, since the spatula must be quickly and expertly used to properly place the uncooked surface of the batter in contact with the heating surface. After again using the spatula to determine whether the batter which is in contact with the heating surface is completely cooked, the operator will then usually remove the completely cooked pancake. As a practical matter the making of pancakes as outlined above requires almost constant attendance, even by the most skilled operators. Thus, in accordance with the foregoing, it is apparent that it will be highly desirable to provide pancake-making equipment which is capable of preparing pancakes by automatically dispensing and cooking the batter without the supervision of an operator. Advantageously, the present automatic pancake-making equipment provides for successively initiating the dispensing of the liquid batter onto the surface of a cooking unit, removing the partially cooked batter to the surface of another cooking unit and then removing the completely cooked pancake from this latter cooking unit. By means of the applicant's automatic pancake-making machine, it is possible to cook a batch of pancakes to order, as required by customer demand or cook large numbers of pancakes on an automatic basis, which can be accomplished without supervision or attention on the part of the operator.

Broadly, it is an object of the present invention to provide an improved machine for preparing a plurality of pancakes from a batter mixture. Specifically, it is within the contemplation of the present invention to provide a machine for automatically dispensing and cooking liquid batter to prepare pancakes without the constant supervision of an operator and which is capable of use over prolonged periods of time with minimum requirements for servicing and supervisory attendance.

In accordance with an illustrative embodiment, demonstrating objects and features of the present invention there is provided an apparatus for preparing thin batter cakes or pancakes from a liquid batter mixture by directly subjecting one face thereof to heat, flipping the same over and directly subjecting the other face thereof to heat. Accordingly, means are provided for successively dispensing measured quantities of the batter mixture. Adapated to receive the liquid batter mixture is a first cooking plate including a cooking surface and means for applying heat thereto, for partially cooking the batter cake by direct contact of one face thereof. The cooking of said partially cooked batter-cake is completed by a second cooking plate having a second cooking surface and means for imparting heat thereto. The first cooking plate is movably mounted on support housing for movement from a normal cooking position into a gravity-releasing position, overlying the second cooking plate and inverted relative thereto. Thus, the first cooking surface, with the partially cooked batter cake thereon, is substantially coextensive with and directed toward the second cooking surface. The first and second cooking plates are disposed in side by side relation and arranged relative to each other such that the second cooking surface will receive the partially cooked batter cake when the first cooking plate is moved into the gravity-releasing position. In order to move the first cooking plate into and out of the gravity-releasing position, driving means are operatively connected thereto. The second cooking plate may also be movably mounted on the support housing by means of drive means operatively connected thereto for moving said second cooking plate from a normal cooking position into a slidable-releasing position. Thus, the cooked batter-cake is placed in a declivity inclined plane with respect to its normal cooking position such that the batter cake is slidably removed from the second cooking surface.

The above brief description as well as further objects, features and advantages of the present invention will be more fully appreciated by reference to the following description of a presently preferred, but nonetheless illustrative embodiment in accordance with the present invention, when taken in connection with the accompanying drawings, wherein;

FIG. 1 is a perspective view of a pancake-making machine embodying features of the present invention;

FIG. 3 is a front elevational view, with parts broken away and sectioned, so as to better show the batter-dispensing unit and the arrangement for turning over the first cooking plate;

FIG. 5 is a left side elevational view, of a portion of the machine showing the first cooking plate as it is moving out of its normal cooking position and in phantom as it is reaching its gravity-releasing position overlying the second cooking plate;

FIG. 6 is a side elevational view similar to FIG. 5, but showing the second cooking plate in its normal cooking position and the first cooking plate in its gravity-releasing position;

FIG. 7 is a transverse section taken along the line 7—7 of FIG. 3 and looking in the direction of the arrows, showing the safety switches associated with the cooking plate motors;

Figure 4:
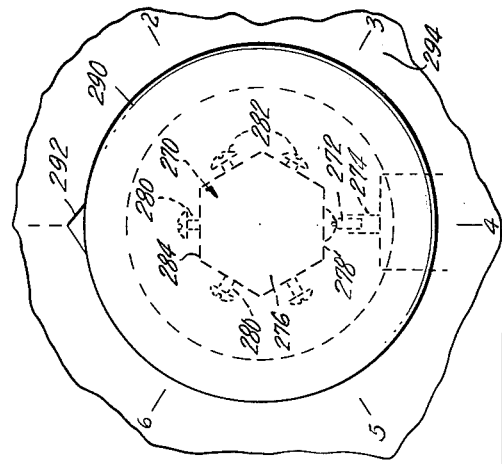
FIG. 4 is a side elevational view of a portion of the machine taken from the right of FIG. 1 showing in phantom, the indexing bar and the concomitant adjustment scale of the batter-dispensing unit by which the number and size of the pancakes may be adjusted.

Referring now specifically to the drawings, there is shown a pancake-making machine embodying features of the present invention, generally designated by the reference numeral 16, which comprises a support housing 18 mounted in any appropriate fashion at a location spaced above the floor. Mounted on the support 18 are the several components of the machine which in general include a receptacle 20 for successively dispensing a liquid batter mixture onto a first or rear cooking plate 22, which is rotatably mounted on the support housing 18. The dispensed batter received by the rear plate 22 is partially cooked by direct contact of one face of said batter with the cooking surface of plate 22. A second or front cooking plate 24 which is also rotatably mounted to the support housing 18 is provided for completing the cooking of the partially cooked batter. The front cooking plate 24 receives the partially cooked batter when the rear cooking plate 22 is moved into a gravity-releasing position by means of cyclic drives 26 and control means 28 operatively connected to the cooking plates 22 and 24. The cyclic drives 26 and control means 28 are also operatively connected to the receptacle 20 for successively dispensing measured amounts of batter mixture.

Figure 2:
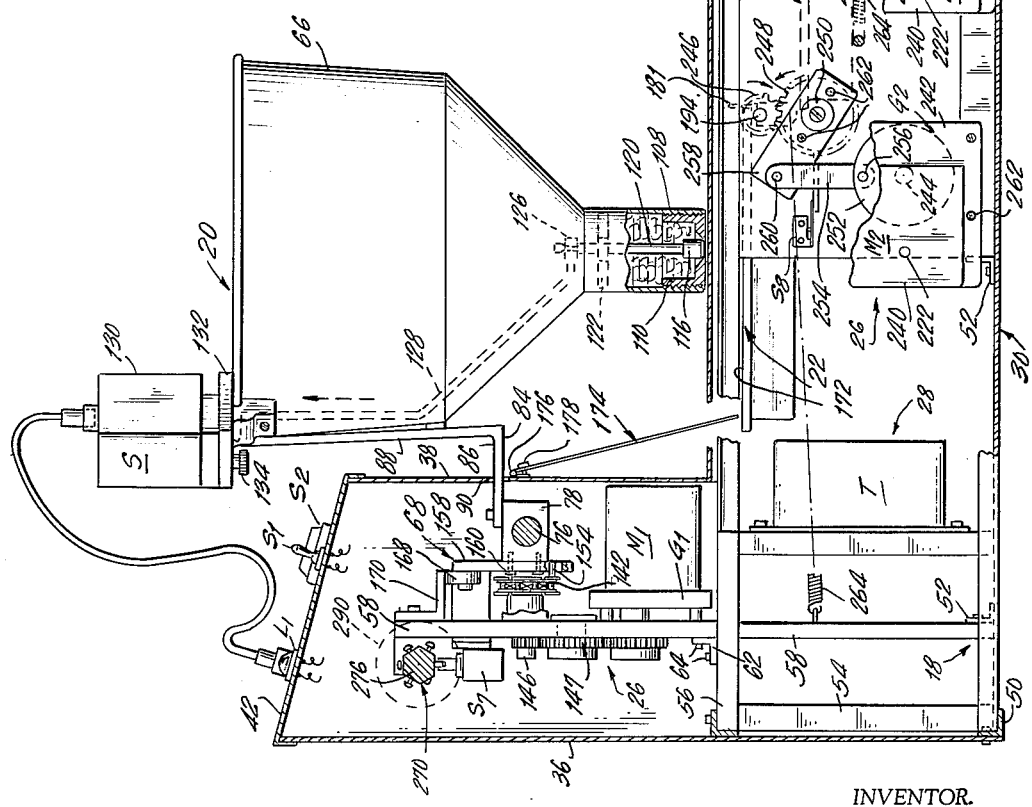
FIG. 2 is a longitudinal section taken along the line 2—2 of FIG. 1 and looking in the direction of the arrows, showing the internal construction of the machine, with parts removed and broken away for clarity.

As best shown in FIGS. 1 to 3, the support housing 18 includes a base frame 30 and housing cowling 32. The housing cowling 32 is preferably made from stainless steel sheets and comprises a pair of rectangular arm sections 34 which are fastened to a U-shaped rear section 36. A face plate 38 is secured along the side edges 40 of rear section 36, and an instrument panel 42 fits over the top edges of face plate 38 and rear section 36. The cowling 32 is completed by a front plate 44 which is located between the arm sections 34. As shown in FIG. 1, the component sections of the cowling 32 are fastened to one another and to the base frame 30 by a series of fasteners 46, such as nuts and bolts, sheet metal screws, or the like. For ease of maintenance, an opening and removable cover 48 is provided in the side of the rear section 36. The base frame 30 which supports the cowling 32, as well as the inner mechanism of the machine, includes a pair of spaced horizontal rods 50 which are joined by a series of rods 52, transversely extending along the length of the rods 50. As shown in FIG. 2, vertical rods 54 extend from and are fastened to the corners of base frame 30, and the vertical rods 54 support an upper frame 56 which is fastened to the ends thereof. Also supported on the base frame 30 are front walls 58 and 60, which are secured to a transverse rod 62 that is mounted on top of the upper frame 56. The rod 62 is an L-shaped angle-iron, so that fastening means 64 can be applied along both a horizontal and vertical plane, as shown in FIG. 2. The front walls 58 and 60 are provided for mounting the batter dispensing unit 20, which will now be described.

Figure 10:
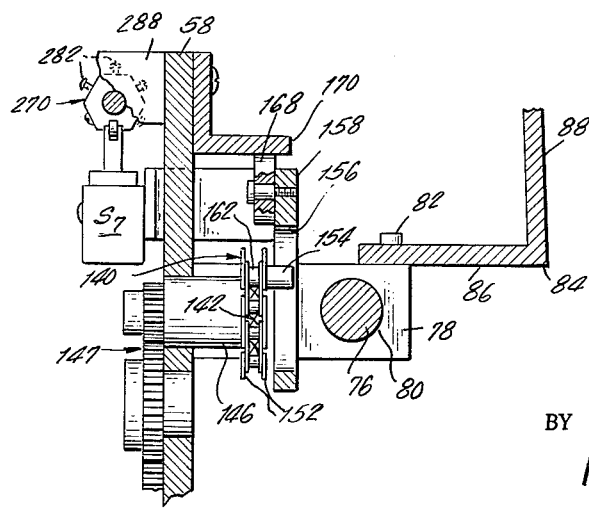
FIG. 10 is a longitudinal sectional taken along line 10—10 of FIG. 9 and looking in the direction of the arrows, showing, in detail, portions of the cyclic drive of the batter dispensing unit.

The batter dispensing unit 20, includes a batter receptacle 66 which is fixed to a carrier 68, that is movably mounted to the front walls 58 and 60. A pair of mounting blocks 70 vertically extend from the front support walls 58 and 60 and are mounted thereto by the fasteners 72. The mounting blocks 70, are provided with central bores 74, for mounting a horizontal cyclindrical bar 76 in a position vertically extending from the plane of the support walls 58 and 60. The position of cylindrical bar 76 and the space between the same and the support walls 58 and 60 can best be seen in FIG. 10.

The carrier 68 includes a pair of rectangular blocks 78 which are adapted to slidably engage the horizontal cylindrical bar 76. Located in the center of blocks 78 are cylindrical bores 80 which have an internal diameter that is slightly larger than the outer diameter of the cylindrical bar 76. Thus, when the blocks 78 are mounted on the cylindrical bar 76, they will easily slide along the length thereof, and the bar 76 will provide a horizontal track for the carrier 68.

Figure 11:
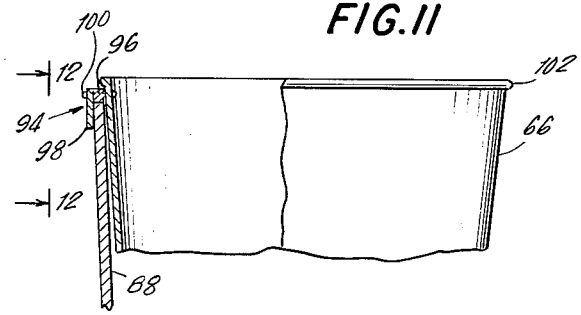
FIG. 11 is an enlarged fragmentary longitudinal section taken along line 11—11 of FIG. 1 looking in the direction of the arrows, showing the removable mounting of the batter dispensing unit.
Figure 12:
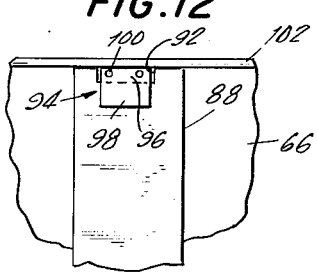
FIG. 12 is an enlarged, fragmentary elevational view similar to FIG. 11 taken along line 12—12 of FIG. 11.

Mounted on the blocks 78 by means of screws 82, is an L-shaped carrier arm 84 having a horizontal section 86 and a vertical section 88 integrally extending therefrom. It should be noted that a transverse slot 90 is provided in the face plate 38, through which the horizontal section 86 extends for allowing reciprocating movement of the carrier 84, which will later be described. As best shown in FIG. 12, the batter receptacle 66 is mounted on the end of vertical section 88, which is provided with a U-shaped extremity 92. The batter receptacle 66 may be removably mounted on the U-shaped extremity 92 by means of an open clamp 94 which is fixed to the outer peripheral edge of the receptacle 66. The clamp 94 includes a block 96 and overlying plate 98 which are secured to the outer periphery of the receptacle 66 by means of a fastener 100. As seen in FIGS. 11, the clamp 94 positions the receptacle 66 in secure engagement with the vertical section 88 of carrier arm 84.

Figure 13:
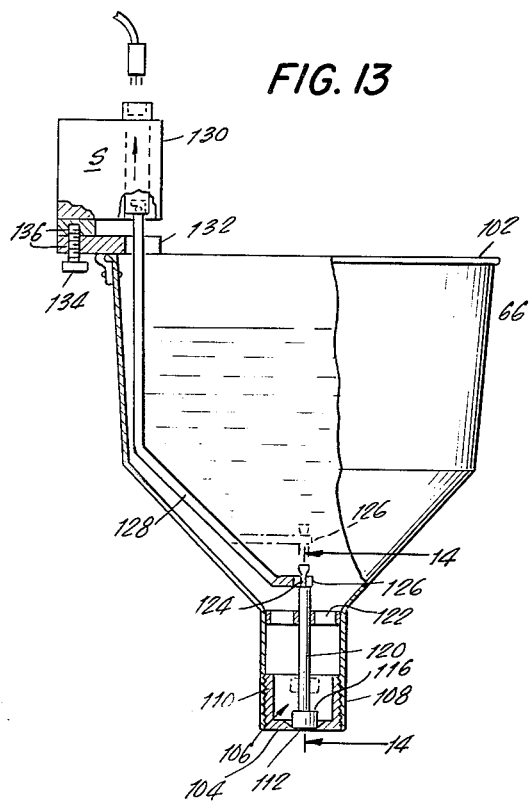
FIG. 13 is a longitudinal section taken along line 13—13 of FIG. 1 and looking in the direction of the arrows, showing the complete batter dispensing unit.
Figure 14:
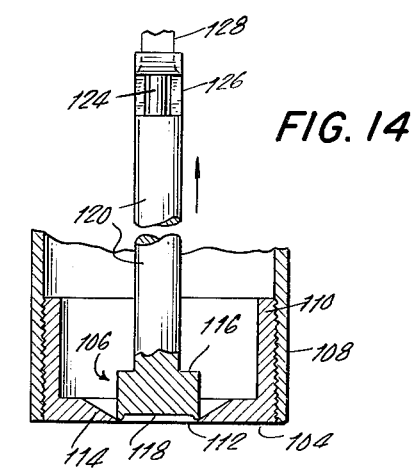
FIG. 14 is an enlarged, fragmentary longitudinal section taken along line 14—14 of FIG. 13 and looking in the direction of the arrows, showing, in detail, the valve means of the batter dispensing unit.
Figure 15:
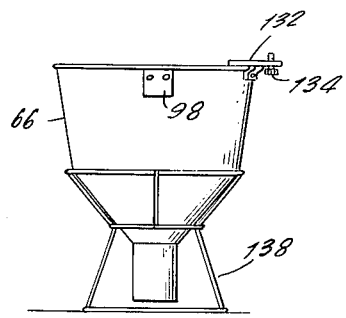
FIG. 15 is a front elevation of the batter dispensing unit removed from the machine and placed in a storage receptacle.

The batter receptacle 66 has an open end 102 for receiving a supply of batter mixture, and a closed end 104 having a valve 106 for dispensing the batter mixture. The closed end 104 of receptacle 66 comprises a reduced neck portion 108 integrally extending from the bottom of the batter receptacle 66 with a threaded closure member 110 disposed therein. The valve 106 includes a valve opening 112 having a chamfered valve seat 114 for seating a valve member 116 within the closure member 110. An indentation 118 is located at the bottom on the outside of the valve member 116 for collecting any batter mixture which might leak through the valve, and thereby preventing accumulations of liquid batter adhering along the exterior surfaces of the closure 110. Integrally extending from the valve member 116, is a valve stem 120 which is disposed within a guide 122 which is secured within the neck 108 of the receptacle 66. As shown in FIGS. 13 and 14, the valve stem 120 includes an end section 124 of reduced diameter for engagement with the bifurcated end 126 of a solenoid rod 128. Provision is made for successively dispensing measured amounts of batter mixture by opening and closing valve 106, through the reciprocation of rod 128 by means of a solenoid S enclosed by a housing 130. The solenoid S is a standard type electro-magnetic coil arrangement and is mounted together with its housing 130 on a mounting platform 132 fixed to the rim of open end 102 of batter receptacle 66. For removably attaching the solenoid S to the platform 132, a threaded screw 134 is provided for engaging a threaded bore 136 disposed in the solenoid housing 130 and platform 132. As shown in FIG. 13, the solenoid rod 128 is secured to the actuated member of the solenoid S, and extends through a clearance opening in platform 132 for raising and lowering valve member 116 from an opened to closed position. It is apparent that all of the valve and solenoid components which are secured to the batter receptacle 66 can easily be removed therefrom, so that the receptacle may be placed in a storage position, such as on a stand 138, shown in FIG. 15. Thus, when the machine is not being used, it is relatively easy to remove the batter receptacle 66 and stand 138 to a refrigerated area. The cyclic drives 26, which will later be described in detail, include a motor $M_1$ and gear train $G_1$ which are operatively connected to the batter receptacle 66 for reciprocatory movement through a batter dispensing cycle. The motor $M_1$ is secured to the housing of gear train $G_1$ which is mounted to the support wall 58, thereby providing a fixed mounting for the cyclic drive 26 of the batter receptacle 66. The rotational output of gear train $G_1$ is translated into reciprocating motion by means of a chain drive including a chain 140 engaged by a drive sprocket wheel 142 and a driven sprocket wheel 144. As best seen in the preferred embodiment in FIGS. 2 and 3, the drive sprocket wheel 142 is connected to output shaft 146 of a reduction gearing arrangement 147 which is mounted on the support wall 58 and the shaft of driven sprocket wheel 144 is mounted in a sleeve bearing 148, located in the support wall 60. The reduction gearing arrangement 147 is connected to the output shaft of gear train $G_1$. The sprocket wheels 142 and 144 have teeth 150 formed on the periphery thereof and which project through a plurality of links 144 in the chain 140. The carrier 68 is movably connected to the chain 134 by means of an elongated link pin 154 extending from one of the links 144 and disposed in groove 156 of a carrier plate 158. As shown in FIG. 2, the carrier 68 is secured to the plate 158 by bolts 160 extending through threaded bores in the blocks 78 and carrier plate 158. The groove 156 serves as a lost motion connection between the chain 140 and the carrier 68, which is necessary for achieving the back and forth reciprocatory movement of the batter receptacle 66.

Figure 9:
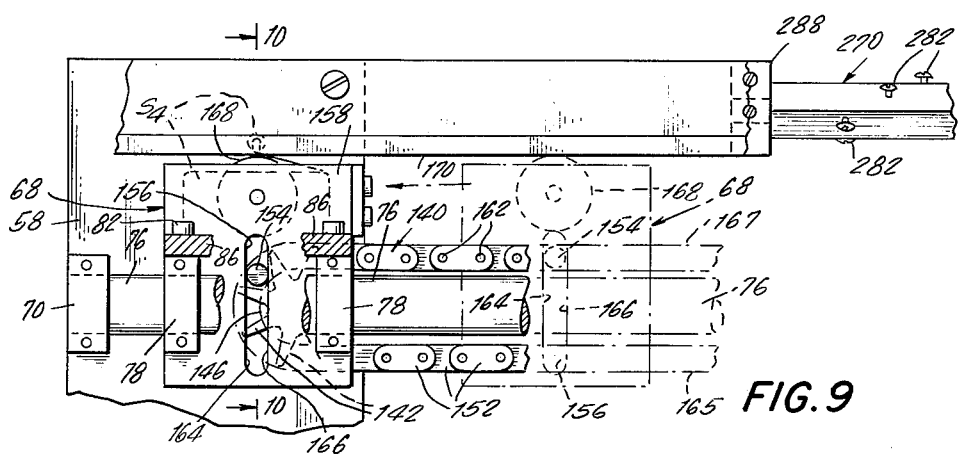
FIG. 9 is an enlarged, fragmentary elevational view similar to FIG. 3, but showing a portion of the cycle drive for the batter dispensing unit, in shadow, during its reciprocatory movement.

It is preferable to mount the elongated link pin 154 by removing one of the pins 162 from the chain 140 and replacing it with the elongated pin 154. The chain 134 is a standard power transmitting chain, such as a block chain or a roller chain. As shown in FIG. 9, the link pin 154 will bear against the left side wall 164 of the groove 156 when the carrier 68 is traveling in the direction of the arrow shown in the phantom view of the carrier 68. When the carrier 68 reaches the end of its return stroke, as shown in solid-line view of the carrier 68 in the above mentioned drawing, the pin 154 will move downwardly in slot 156 until it reaches a level which is in the same plane with the lower horizontal portion 165 of chain 140. Thus pin 154 will bear against the right side wall 166 of groove 156 when the carrier 68 is traveling from right to left. The change of direction of the carrier 68 at the driven sprocket wheel 144 will function in a similar manner as has been described above for the change of direction at the drive sprocket wheel 142, except that the elongated pin 144 will move in an opposite direction or upwardly in groove 146 until reaching the upper horizontal portion 167 of chain 140. It should be noted that the left and right side walls 164 and 166 of grooves 156 must be of a greater length than the distance between the outer extremities of the lower and upper horizontal portions 165, 167 of chain 140 in order to allow sufficient clearance for the carrier 68 to change directions during its reciprocatory movement.

In order to balance the appreciable weight resulting from the receptacle 66 being filled with a supply of batter mixture, the carrier 68 is provided with a balancing wheel 168 and runner 170. The balancing wheel 168 is rotatably mounted on carrier plate 160 and rides along the lower surface of the runner which is L-shaped and bolted to front support wall 58.

With reference to FIGS. 2, 3, 5, and 6 wherein like reference numerals designate similar parts throughout the various views, the rear cooking plate 22 and front cooking plate 24 shown therein are mounted on the support housing 18 and have heating surfaces 172 for receiving and cooking the dispensed batter D. In the preferred embodiment of the pancake making machine 16, the heating surfaces 172 are coated with a tetrafluorethylene resin finish, sold under the trademark "Teflon" Since this resin finish has high heat stability and antisticking properties, the need for applying shortening or cooking oil to the cooking surface 172 is eliminated. Also the use of a "Teflon" coating provides a small amount of adhesion between the dispensed batter D and the heating surface 172 of rear cooking plate 22. This small amount of adhesion is particularly important when the rear cooking plate 22 is rotated from a normal cooking position into a gravity-releasing position overlying the front cooking plate 24. As shown in the phantom view of the rear cooking plate 22 in FIG. 5, its heating surface 172, when in the gravity-releasing position, is inverted relative to the cooking surface 172 of the front cooking plate 24 such that the rear cooking surface with the partially cooked batter PB thereon, is substantially coextensive with and directed toward the front cooking surface. Thus, it is apparent that the small amount of adhesion maintained between the heating surface 172 and the partially cooked batter PB will prevent the partially cooked batter PB from falling or sliding from the rear cooking plate 22, before it reaches its gravity-releasing position.

In order to insure that the adhesion between the partially cooked batter PB and the rear cooking surface 172 is not too great, a spatula arrangement 174 is hingedly mounted on the face plate 38. The spatula 174 comprises a flat sheet of substantially the same width as the rear cooking plate 22. As shown in FIG. 2, the spatula 174 is mounted to hinge 176 by means of stop screws 178, and ends of which bear against face plate 38 to maintain the spatula 174 at an angle with respect to the vertical plane of face plate 38. Thus, by means of the stop screws 178, the leading edge of spatula 174 is maintained in a normal position which is above the plane of the rear cooking surface 172 when the rear cooking plate 22 is in its normal horizontal cooking position, and the leading edge of the spatula 174 will rest on the rear edge portion of the rear cooking surface 172. As shown in FIG. 5, the spatula 174 is swung outwardly when the rear cooking plate 22 begins its movement toward the gravity-releasing position, and the leading edge of spatula 174 slides underneath the partially cooked batter PB which is adhered to the rear cooking surface 172, thereby insuring that the partially cooked batter will be released when the rear cooking plate 22 reaches the gravity-releasing position. The spatula 174 is made from a heat resistant, resilient fiber glass material. When the rear cooking plate 22 returns to its normal cooking position from its gravity-releasing position, the rear edge 180 thereof engages the front surface of spatula 174 and causes the resilient material thereof to bend, thereby allowing the rear cooking plate 22 to clear the front surface of spatula 174. The rear cooking plate 22 includes a vertical guard ledge 181 extending from the cooking surface 172.

It should be noted that it is possible to operate a pancake making machine, in accordance with the present invention, which has standard heating surfaces 172 which are not coated with any resinous substance. However, when proceeding in this manner, it is necessary for the operator to apply the precise amount of shortening to the heating surfaces 172, which will provide the necessary clinging effect automatically obtained by using "Teflon." Also, an operator would have to be in attendance to continuously reapply the cooking oil to the heating surfaces 172.

The front and rear cooking plates 22, 24 will now be described, the components of which are substantially similar and will thus be designated by the same reference numerals. Referring to FIG. 3, a pair of vertical supports 182 are fixed to the base frame 30 and upper frame 56 by means of transverse rods 184, which are secured by suitable fasteners such as a nut and bolt arrangement. Opposing bores are formed in the supports for receiving sleeve bearing 188 located proximate the cyclic drives 26 and sleeve bearing 190 spaced opposite therefrom. Rotatably mounted on the bearings 188 and 190 is a horizontal mounting assembly 192 which includes a drive shaft 194 rotatably disposed in the bearings 188 and connected to a support shaft 196 rotatably disposed in the bearing 190. The support shaft 196 is joined to the drive shaft 194 by means of a bracket 198 which includes a horizontal platform 200 for attaching one end of shaft 196 and a vertical section 202 integrally extending from the platform 200 and having a bore for attaching one end of shaft 194. One of the free ends 208 of support shaft 196 is rotatably disposed in the bearing 190 and the other free end 208 is mounted on platform 200 by means of set screw 206. The free end 210 of drive shaft 194 is rotatably disposed in a sleeve bearing 188 mounted in the bores in support 182 and fixed to a pinion gear 246 which is operatively connected to the output pinions of gear trains $G_2$ and $G_3$. The heating surfaces 172 of the rear and front cooking plates 22 and 24 are mounted on a horizontal flat section 214 formed on support shaft 196 and may be secured by operations such as welding or brazing. Fixed beneath the heating surface 172, is a series of heating elements 216, which are the standard type electrical heating coils, and a housing cover 218 is provided for enclosing the heating elements 216.

Figure 8:
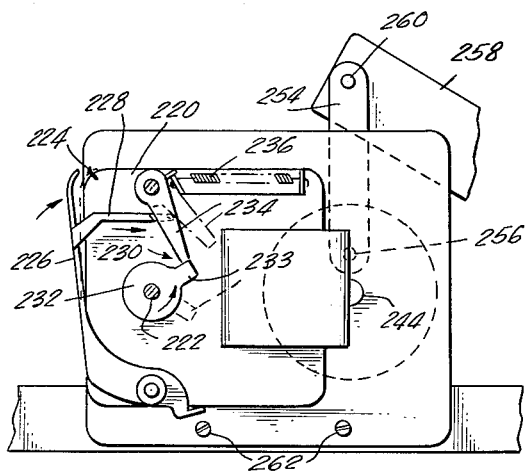
FIG. 8 is a transverse section taken along line 8—8 of FIG. 3 and looking in the direction of the arrows, showing the motor construction and its associated breaking mechanism.

The drive means of the cyclic drives 26 comprise a combined alternating current induction motor and solenoid and include a carrier motor $M_1$, rear plate motor $M_2$, and front plate motor $M_3$. These motors may be of the same capacity, and as shown in FIG. 8, comprise a stationary magnetic core 220 which surrounds a rotor carried by a shaft 222. The core 220 also serves as a magnetic element for the solenoid portion 224 of the motor. Pivotally mounted to the magnetic core 220, is the solenoid arm 226 which has a finger 228 integrally extending therefrom for engaging a breaking mechanism 230. The breaking mechanism 230 includes a circular cam 232 having a tooth 233 integrally extending therefrom. A cam follower 234 is pivotally mounted to the magnetic core 220 and is biased into engagement with the cam 232 by means of a tension spring 236. When a source of alternating current is placed across the magnetic core 220, the solenoid arm 226 will be attracted by the core 220, thereby causing the finger 228 to engage and move the cam follower 234 out of the path of rotation of the tooth 233. It is apparent that when the source of alternating current is removed from the magnetic core 222, the solenoid arm 226 will no longer be magnetically attracted, and the tension spring 236 will exert sufficient pressure on the end of the follower 234 to cause pivotal movement toward the path of rotation of the tooth 233. Accordingly, the follower 234 engages the tooth 233, thereby obstructing the rotary path thereof and causing instantaneous breaking action of the motor. In FIG. 8, the phantom view of the finger 228, cam tooth 233 and cam follower 234, shows the position of these elements while the motor is in operation, while the solid line view of these elements denotes the breaking position thereof.

The cyclic drives 26 also include a carrier gear train $G_1$, rear plate gear train $G_2$ and front plate gear train $G_3$, which are operatively connected to motors $M_1$, $M_2$ and $M_3$, respectively. The above three gear trains are similar in construction and include a standard type reduction gearing arrangement for transmitting at a reduced rate of speed, the rotary motion of the motor shaft 222. As previously noted, the motor housing is mounted on the gear housing 242, which is secured to the support housing 18.

As best seen in FIGS. 2, 3, 5 and 6, the rear and front cooking plates 22 and 24 are each operatively connected to the output shaft 244 of the gear trains $G_2$ and $G_3$. The drive shaft 194 of the cooking plates 22 and 24 extends past the bear 188 and a pinion gear 246 is fixed thereto for engaging the teeth of an idler gear 248 fixed to a shaft which is rotatable in sleeve bearings 250 mounted on the vertical support 182. An eccentric 252 is keyed to the output shaft 244 of the gear trains and a crank rod 254 is pivotally mounted on the inner peripheral face of the eccentric 252 by means of a crank pin 256. The crank rod 254 communicates with the idler gear 248 by means of a link rod 258 which is pivotally mounted to crank rod 254 by means of a pin 260 and is fixed to idler gear 248 by means of the fasteners 262. The gearing arrangement for the front and rear cooking plate 22 and 24 and their accompanying linking mechanism have substantially similar component parts, but the crank rod 254 of the rear cooking plate 22 is mounted close to the periphery of eccentric 252, while the crank rod 254 of the front cooking plate 24 is mounted at a location close to the center of eccentric 252. Similarly, the idler gear 248 of the rear cooking plate 22 is mounted below the pinion gear 246, while the idler gear 248 of the front cooking plate 24 is mounted to the left of pinion gear 246. The difference in placement of the gear 248 and crank rod 254 stems from the fact that the rear plate 22 is moved through a greater angle of rotation than is the front plate 24. Accordingly, by properly locating and spacing the gear and linkage arrangements, as outlined above, one revolution of the rear cooking plate eccentric 252 will invert the rear cooking plate 22 and bring it back to its normal position, while one revolution of the front cooking plate eccentric 252 will raise it in a downwardly inclined plane with respect to the normal plane of its cooking surface, and return it to its normal cooking position.

It should also be noted that different size loads are placed on the respective cyclic drives 26 for each of the cooking plates 22 and 24. The motor $M_2$ in particular, carries a greater load than the motor $M_3$, and as an aide to the load capability of the motors $M_2$ and $M_3$, a tension spring 264 is connected between the front support wall 58 and a pivotal arm 266 which extends from the front of the cooking plates 22 and 24. The spring 264 used for plate 22 is heavier than the one used for plate 24 to thereby generate a greater torque on plate 22 in accordance with the difference in load capacity as outlined above. The spring 264 plays an important role in the operation of the machine in accordance with the preferred embodiment of the invention, since it permits the use of compact motors of relatively low horsepower. As best seen in FIG. 5, the eccentric 252 rotates in a clockwise direction and transmits this rotor motion to crank rod 254, link rod 258 and idler gear 248 which likewise rotate in a clockwise direction. Thus, pinion gear 246 which engages idler gear 248 will rotate in a counter clockwise direction thereby pivotally rotating the cooking plates 22 and 24. The torque generated by the spring 258 will also be in a clockwise direction taken about the center of the pinion 246, thus aiding the lifting power of the motors $M_2$ and $M_3$.

Figure 16:
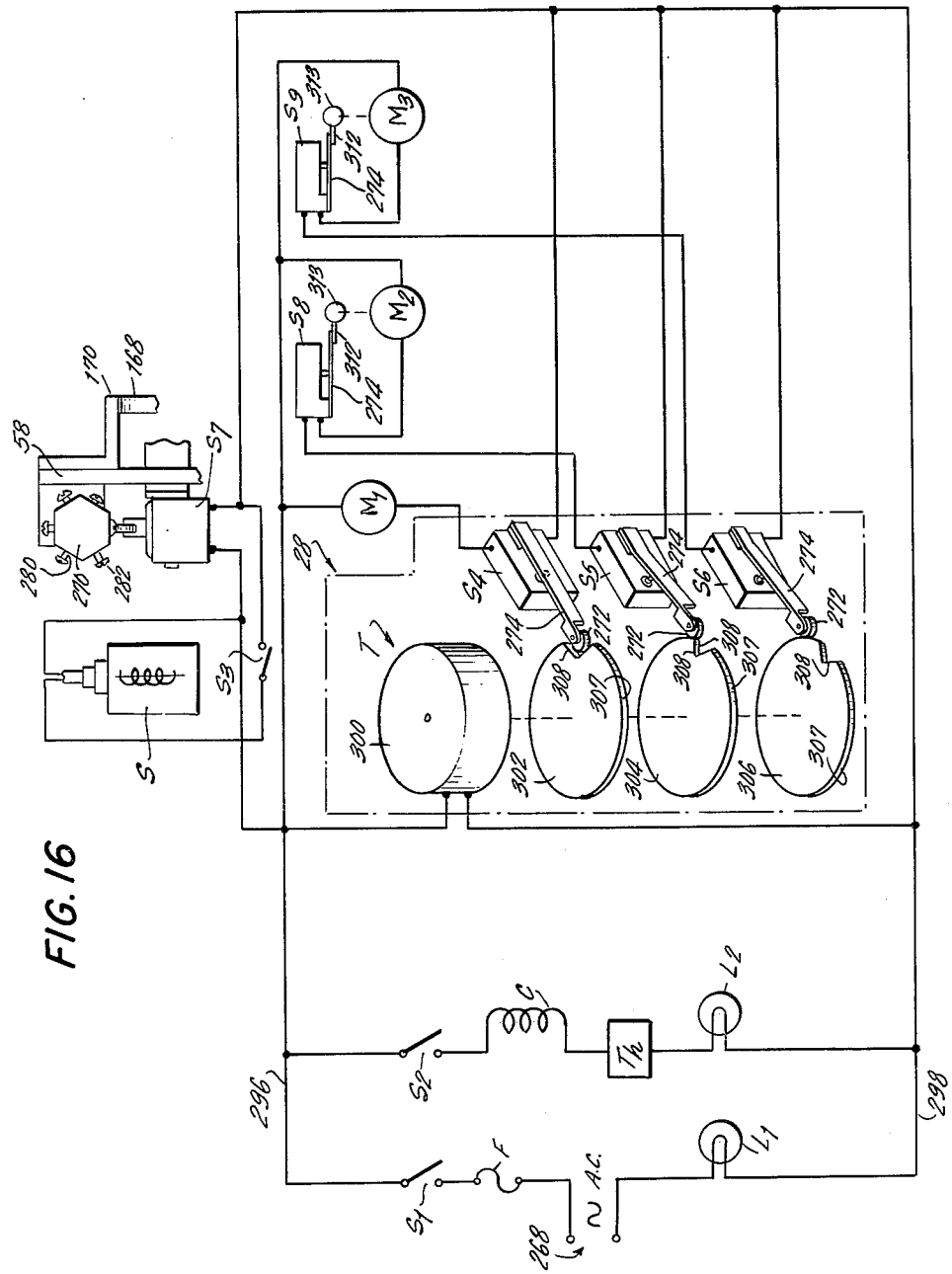
FIG. 16 is a schematic wiring diagram of the electric energization circuit for the pancake machine.

The pancake machine 16 is provided with a complete electric circuit 268, illustrated in FIG. 16, including the solenoid S, which is movably mounted on the batter receptacle 66, as previously described. The solenoid S is actuated by means of a microswitch $S_7$ which is movably mounted on the carrier 68. A longitudinal indexing cam 270 is mounted between the front support walls 58 and 60 for engaging a follower wheel 272 carried by the switch arm 274 of the switch $S_7$, thereby actuating the solenoid S. The indexing cam 270 includes a bar 276 each side 278 of which is configured for controlling the number of actuations of solenoid S and the length of time for each of said actuations. The number of actuations are controlled by providing a given number of actuating screws 280 arranged in a row as shown in FIG. 3. The length of time for each actuation of the solenoid S is determined by the height of the head 282 of each screw 280 from the flat surface 284 of each side 278 of the bar 276. In the preferred embodiment of the invention the bar 276 is hexagonal in shape and each side 278 has a row of screws 280 in which the height of the screw heads 282 from the surface 284 differs in the various rows. As shown in FIG. 4 the screw heads 282, in the row of screws positioned to engage the switch $S_7$, are flush with the surface 284, and the screws 282 in each succeeding row, moving in a counter-clockwise direction, are at a greater height with respect to the surface 284. As seen in FIG. 3, the bar 276 has a shaft 286 fixed to one end thereof and rotatably mounted on a bearing block 288 which is secured to the rear of support wall 60; a similar bearing block arrangement with a rotatable shaft extending from the opposite end of the bar 276 and disposed in a bearing block is also mounted to the rear of support wall 58. The shaft 286 extends through a clearance opening in the side of rear housing section 36 and an indexing handle 290 is secured thereto for rotating the bar 276, thereby bringing a different row of actuating screws 280 into position for engagement with switch $S_7$. As shown in FIG. 4, the indexing handle 290 has a pointer 292 extending therefrom which may be rotated around a scale 294 on the surface of rear housing section 36 in order to indicate which set of actuating screws has been indexed into position. During the reciprocating movement of the carrier 68, each of the actuating screws 280 on a side 278 of the bar 276 will engage the follower wheel 272 of switch $S_7$ to thereby initiate the release of a measured amount of the batter through the actuation of the solenoid S. As the height of the actuating screw heads 282 is increased with respect to the distance thereof from the surface 278, the follower wheel 272 will dwell in a closed position for a longer period of time, which results in the solenoid S being activated for a longer time interval thereby maintaining the batter receptacle valve 106 open for a longer period to dispense larger measured amounts of batter. Each side 278 of the indexing bar 276 is provided with various different numbers of actuating screws 280, thereby allowing the operator to change the number of pancakes in each batch made during an operating cycle of the machine.

The operation of the illustrative embodiment of the present invention described herein, will be readily apparent by referring to the operative electrical circuit 268, shown in FIG. 16 and the control panel 42 shown in FIG. 1. In use, an operator actuates the main switch $S_1$ to energize the electrical circuit 268. The only other manual operations required by the operator, is the actuation of switches $S_2$ and $S_3$. The switch $S_2$ is a thermostatic control switch which may be set at the temperature desired for the cooking plates 22 and 24. Accordingly, the setting of the switch $S_2$ results in energization of heating coils C of the cooking plates, the bi-metallic thermostatic switching element $T_h$, and the thermostat light $L_2$. When the cooking plates reach the pre-set temperature of switch $S_2$, the thermostatic sensing element $T_h$ will open the circuit including the coils C and light $L_2$, thereby extinguishing light $L_2$ and indicating that the pre-set temperature has been attained. The switch $S_3$ is provided for removing the solenoid S from the circuit 268 in the event that it is desired to operate the machine with the batter receptacle valve 106 in a closed position. Thus, if in the course of operating the machine the batter receptacle 66 becomes exhausted, it is possible to replenish the batter supply while the machine is running, by merely opening switch $S_3$, which will result in the batter receptacle valve 106 being maintained in a closed position. The circuit 268 includes two parallel conductor legs 296, and 298 across which are connected the main switch $S_1$, overload fuse F, and a circuit actuation indicator light $L_1$.

As previously described herein, the carrier 66, rear cooking plate 22 and front cooking plate 24 are operatively connected to the carrier motor $M_1$, rear plate motor $M_2$ and front plate motor $M_3$, respectively. Each of the motors $M_1$, $M_2$ and $M_3$ are connected in series with microswitches $S_4$, $S_5$ and $S_6$, respectively, and each of the foregoing series connected micro-switch and motor circuits is placed in parallel in the energization circuit 268 by being connected across the legs 296 and 298. In order to successively initiate the dispensing of batter, the moving of rear cooking plate 22 into and out of a gravity-releasing position, and the moving of front cooking plate 24 into and out of a slidable-releasing position, control means 28 are electrically operatively connected in the electrical energization circuit 268. The control means 28 includes a timer T comprising a timer motor 300 connected in parallel in the energization circuit 268. Mounted on the output shaft of the timer motor 300 are the carrier control cam 302, rear plate control cam 304, and front plate control cam 306. The timer T is a standard industrial type timer which is placed in continuous operation when the circuit is energized by closing the main switch $S_1$, thereby continuously rotating the control cams 302, 304 and 306 through their respective timing cycles. As shown in FIG. 16, each of the motor micro-switches $S_4$, $S_5$ and $S_6$ have follower wheels 272 mounted on the ends of the switch arms 274 for engaging the cam tracks 307. The cam tracks are configured and positioned on the shaft of timer motor 300 such that there is successive actuation of the switch $S_4$ and carrier motor $M_1$, the switch $S_5$ and rear plate motor $M_2$, and then the switch $S_6$ and front plate motor $M_3$. As shown in FIG. 16, each of the control cams 302, 304 and 306 are provided with notches 308 for successively actuating the electrical circuit 268. Accordingly, there will be successive initiation of: reciprocatory movement of the batter receptacle 66 and opening of switch $S_4$ when the batter receptacle reaches a clearance position; movement of the rear cooking plate 22 from a normal cooking position into a gravity-releasing position overlying the front cooking plate 24 and opening of the switch $S_5$ when the rear cooking plate 24 is returned to its normal cooking position; and movement of the front cooking plate 24 into a slidable-releasing position in a declivity inclined plane with respect to the plane of its normal cooking position and opening switch $S_6$ when the front cooking plate 24 returns thereto. As has been previously described, the switch $S_7$ is secured to carrier 66 and the reciprocatory movement thereof will cause the follower wheel 272 of micro-switch $S_7$ to contact the bar 276 and move horizontally along the indexing cam 270. When the completely cooked pancakes are slidably released by the front cooking plate 34, they are received by a receptacle 310 removably attached to the face plate 44, as shown in FIG. 1. It is also possible to provide means for moving the completely cooked pancake to another area, by removing the receptacle 310 and positioning a conveyor below the front cooking plate 24.

In order to insure precise rotational operation of the cooking plates 24 and 26, a safety micro-switch $S_8$ is placed in series connection with micro-switch $S_5$ and motor $M_2$ and a safety micro-switch $S_9$ is placed in series connection with switch $S_6$ and motor $M_3$. As best seen in FIGS. 2 and 7, the safety micro-switches $S_8$ and $S_9$ are secured to the vertical support wall 182 and their switch arms 274 are engaged by actuating levers 312 mounted on a hub 313 integral with the face of the idler gear 248. Thus, after the idler gear 248 makes one complete rotation, the safety switch is engaged by the actuating lever 312 thereby opening the respective electrical circuits of motor $M_2$ and $M_3$. The safety switches $S_8$ and $S_9$ have been found to improve the operation of the machine by providing precise deactuation of motors $M_2$ and $M_3$. It is apparent that the notches 308 in the control cams, when engaging the micro-switch follower wheels 272, similarly perform the function of deactuating motors $M_2$ and $M_3$ as well as motor $M_1$.

The spatula arrangement 276, as previously described, is provided for engaging the rear cooking plate 22 and a portion of the partially cooked pancakes thereon, so that this portion of the partially cooked pancakes is released from the rear cooking plate when movement toward the gravity releasing position is commenced. It is not essential to the operation of the pancake-making machine to provide this type of spatula device 276. However, the use of an automatic spatula or equivalent means, such as a vibration device operatively connected to the rear cooking plate 22, has been found to be advantageous in reducing the adhesion between the partially cooked pancakes and the surface 172 of the rear cooking plate 22. It should be noted that there is a much greater adhesion between the side of the partially cooked batter engaging the rear cooking plate surface than the adhesion between the side of the partially cooked batter engaging the surface 172 of the front cooking plate 24. This difference in adhesion stems from the fact that the batter mixture when initially dispensed onto the rear cooking plate 22, is in a liquid state, thereby having a tendency to stick to the rear cooking plate surface. Further, the initial cooking of the dispensed batter causes bubbling and an irregular surface is formed on the portion of the partially cooked batter which is not in contact with the rear cooking surface. Thus, this irregular surface of the partially cooked pancake, which is ultimately placed in contact with the front cooking plate 24, has less tendency to stick thereto.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. Apparatus for forming and preparing pancakes comprising a support, a dispenser for pancake batter mounted on said support, valve means for controlling the flow of batter from said dispenser, a first cooking plate including means for imparting heat thereto and having a first cooking surface adapted to receive said pancake batter for partially cooking said pancake by direct contact with one face thereof, a second cooking plate including means for imparting heat thereto and having a second cooking surface adapted to complete the cooking of said partially cooked pancake, means pivotally mounting said first cooking plate on said support for movement from a horizontal plane into a gravity-releasing position overlying said second cooking plate and inverted relative thereto such that said first cooking surface with the partially cooked pancake thereon is substantially coextensive with and directed toward said second cooking surface, said first and second cooking plates being disposed in side by side relation with the second cooking plate being at a slightly lower level than the first cooking plate whereby the second cooking surface is closely adjacent the first cooking surface when said first cooking plate is moved into said gravity-releasing position, means operatively connected to said second cooking plate for tilting the same to an inclined position to slidably release the cooked pancakes from said second cooking surface, and means operatively connected to said cooking plates for moving the same in sequence.

2. An apparatus as defined in claim 1, said first and second cooking surfaces coated with a tetra-fluoroethylene finish for preventing the batter from sticking to said cooking surfaces and providing sufficient adhesion between the partially cooked batter and said first cooking surface to maintain said partially cooked pancakes adhered to said first cooking surface until said gravity-releasing position is reached.

3. An apparatus as defined in claim 1, means pivotally mounted on said support and having a portion thereof resting on asid first cooking surface when in said normal cooking position, said portion slidably engaging said first cooking surface and a portion of the partially cooked batter thereon such that said portion of the partially cooked batter is released from said first cooking surface when movement toward said gravity-releasing position is commenced.

4. An apparatus as defined in claim 3, said first and second cooking surfaces coated with a tetra-fluoroethylene finish for preventing the batter from sticking to said cooking surfaces and providing sufficient adhesion between the partially cooked batter and said first cooking surface to maintain said partially cooked pancakes adhered to said first cooking surface until said gravity-releasing position is reached.

References Cited by the Examiner

UNITED STATES PATENTS

| | | | |
|---|---|---|---|
| 1,844,339 | 2/32 | Shaw | 99—424 |
| 2,067,849 | 1/37 | Hunter | 99—354 |
| 2,571,344 | 10/51 | Dashwood | 99—423 |
| 2,571,373 | 10/51 | Massecar | 99—423 |
| 2,702,655 | 2/55 | Lopata | 107—27 |
| 2,779,298 | 1/57 | Chwirut et al. | 107—14.8 |
| 2,830,529 | 4/58 | Jaffe | 99—423 |
| 2,867,162 | 1/59 | Hunter et al. | 99—354 |
| 3,008,601 | 11/61 | Cahne | 99—422 |
| 3,092,014 | 6/63 | Macchi | 99—423 |

CHARLES A. WILLMUTH, *Primary Examiner.*

LAWRENCE CHARLES, ROBERT E. PULFREY,
*Examiners.*